US011405513B2

United States Patent
Chan et al.

(10) Patent No.: US 11,405,513 B2
(45) Date of Patent: Aug. 2, 2022

(54) PRINTER CONTROL AUTOMATION FROM DOCUMENT ANNOTATION

(71) Applicant: KYOCERA Document Solutions, Inc., Osaka (JP)

(72) Inventors: Sam Chinh Co Tang Chan, Garden Grove, CA (US); Duc Phu Truong, Westminster, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/945,630

(22) Filed: Jul. 31, 2020

(65) Prior Publication Data

US 2022/0038588 A1 Feb. 3, 2022

(51) Int. Cl.
| | | |
|---|---|---|
| H04N 1/40 | (2006.01) |
| H04N 1/00 | (2006.01) |
| G06N 3/08 | (2006.01) |
| G06F 40/40 | (2020.01) |
| G06N 3/04 | (2006.01) |
| G06V 30/40 | (2022.01) |

(52) U.S. Cl.
CPC ......... *H04N 1/00395* (2013.01); *G06F 40/40* (2020.01); *G06N 3/04* (2013.01); *G06N 3/08* (2013.01); *G06V 30/40* (2022.01); *H04N 1/00212* (2013.01)

(58) Field of Classification Search
None
See application file for complete search history.

(56) References Cited

U.S. PATENT DOCUMENTS

| | | |
|---|---|---|
| 6,799,302 B1 | 9/2004 | Sites |
| 7,333,229 B2 | 2/2008 | Itai |
| 7,446,895 B2 | 11/2008 | Eden et al. |
| 7,800,775 B2 | 9/2010 | Ono et al. |
| 7,814,417 B2 | 10/2010 | Tomita et al. |
| 7,859,705 B2 | 12/2010 | Gokaraju et al. |
| 10,104,247 B2 | 10/2018 | Packirisamy et al. |
| 2003/0076537 A1 | 4/2003 | Brown |
| 2004/0017577 A1 | 1/2004 | Ostrover et al. |
| 2005/0088676 A1 | 4/2005 | Kitada et al. |
| 2005/0200887 A1 | 9/2005 | Bai |
| 2005/0280837 A1* | 12/2005 | Ono ........................ G06F 3/128 358/1.1 |
| 2007/0223025 A1 | 9/2007 | Hashizume |
| 2014/0055804 A1 | 2/2014 | Eguchi |
| 2019/0265929 A1* | 8/2019 | Kitagata ............... G06F 3/1287 |

* cited by examiner

*Primary Examiner* — Dung D Tran
(74) *Attorney, Agent, or Firm* — Rowan TELS LLC (57) ABSTRACT

Techniques to parse an electronic document to extract a comment and topological features of the electronic document to which the comment is attached, transform the comment into one or more printing command and one or more parameters of the printing command, generate a printed document from the electronic document, and apply the printing command and parameters of the printing command specifically to the topological features to which the comment is attached when generating the printed document.

16 Claims, 8 Drawing Sheets

| HOLIDAY2020.CSV | |
|---|---|
| A | B |
| Wednesday, January 1 | New Year Holiday |
| Monday, January 20 | Martin Luther King Jr. Day |
| Monday, February 17 | President's Day |
| Friday, May 1 | Golden Week |
| Monday, May 25 | Memorial Day |
| Friday, July 3 | Independence Day |

PRINTER CONTROL AUTOMATION FROM DOCUMENT ANNOTATION

BACKGROUND

Popular word processing and digital document manipulation tools, such as Portable Document Format (PDF) reader applications, enable users to insert comments into electronic documents. For instance, a user may select a section of text and right click to add a comment. In many cases the comments are "view only", meaning they may not print on paper. Comments inserted into an electronic document may include instructions to be read by other users to make modifications to or process the electronic document. Current printing systems lack the capability to utilize comments to formulate machine control instructions and commands. Therefore a need exists for a printing system configured to transform and apply comments in electronic documents as printing commands.

BRIEF SUMMARY

Techniques for printer control automation from document annotations involves parsing an electronic document to extract a comment and topological features of the electronic document associated with the comment. The method analyzes the comment to identify a printing command. The method analyzes the comment to identify parameters of the printing command. The method operates a printer with the printing command and parameters of the printing command on topological features of the document attached to the comment.

A system for performing printer control automation from document annotations includes a parser and a processor. The parser extracts the comments and topological features of the electronic document associated with the comments. The processor is adapted to transform the comments into executable instructions for a print engine. The processor is adapted to determine parameters of the executable instructions from the comments and topological features of the electronic document to which the comments are attached. The processor applies the executable instructions and parameters to the print engine.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Techniques are described herein for printer control automation from document annotations. These techniques may extract comments and topological features from the electronic document. "Topological features" refers to any feature of a document lending the document visible structure. Topological features include document fields, headers, tables, blank areas (whitespace), horizontal and vertical lines, boxes, section markers, page markers, paragraphs, images, and so forth. "Comment" refers to any annotation added to a document to define operations to perform on content in the document. The comment may define operations on the document overall, or operations on specific topological features of the document. The comments may in some cases be analyzed to identify one or more of a file locator, a horizontal range, and a vertical range in a file identified by the file locator. A processing loop may then be iterated across discrete locations of the horizontal range and the vertical range. At each iteration a different version of the electronic document may be generated with a value or values from a different one or more of the discrete locations, at a location or locations associated with the topological features associated with the comment.

In some configurations, the file locator may be a uniform resource locator, and/or a document field to which the comment is attached. "Document field" refers to a defined topological area of a document. Document fields are often editable, meaning that they enable data input in the region by a user. Data entered in a document field is different than a comment; the former being actual content that is entered into the field, and the latter being an annotation or other metadata describing the document or data in the document field and more particularly operations to perform on the document or document field. The file identified by the file locator may for example be a spreadsheet or delimiter-separated value file format that utilizes delimiters such as commas, tabs, and colons. "File" refers to a collection of stored signals (data values and/or instructions) containerized as a single manipulatable object in a computer system. Examples of these files types include comma-separated values (CSV) file and tab-separated values (TSV) file. The horizontal range may in some cases be a single column, while the vertical range may be a single row. The discrete locations may thus for example be cells of a spreadsheet.

In some configurations, the comment may be an annotation to the electronic document that is visually associated and/or linked with the topological features.

Systems are described for performing printer control automation from document annotations. Such systems may utilize a document annotator, a parser, and a processor. The document annotator (e.g., any document editing application) may be operated to add comments to an electronic document, and subsequently the parser operates to extract the comments and any topological features of the electronic document associated with the comments. The processor is adapted to perform several actions. In some instances, the processor analyzes the comments for a file locator, analyzes the comments for a horizontal range and a vertical range in a file identified by the file locator, and executes a loop command iterated across discrete locations of the horizontal range and the vertical range. In the loop, the processor generates at each iteration a different version of the electronic document and inserts into the different version a value (or values) from a different one of the discrete locations at a location associated with the topological features.

In other embodiments, printer control automation from document annotations is carried out by parsing an electronic document to extract a comment and topological features of the electronic document associated with the comment. The method analyzes the comment to identify a printing command. The method analyzes the comment to identify parameters of the printing command. The method operates a printer with the printing command and parameters of the printing command, specifically on content of the electronic document associated with the topological features.

The comment may in some instances include one or more images. The image may be an input to a neural network (e.g., a convolutional neural network classifier structure) to generate a classification of the comment. "Neural network" should be understood to have its conventional meaning in the arts as pertaining to any of a class of algorithms and structures for processing and classifying input vectors using multiple layers of artificial neurons. The comment may often include text. The text may be an input to a natural language processor (which itself may be and/or utilize a recurrent neural network, for example) to extract parameters of the printing command. "Natural language processor" should be understood to have its conventional meaning in the arts as pertaining to any of a class of algorithms and structures for manipulating and interpreting content encoded as natural human language. The printing command may be an executable instruction for a print engine of the printer. The printing command may encode or represent instructions to extract and email a portion of the electronic document associated with the topological features.

By way of example, the topological features may include a Tillable document field, and the method may be executed on a printer digital front end coupled to and controlling the printer. "Digital front end" refers to a computer system that operates to apply settings to a printer to carry out document processing. The digital front end and printer may be integral or may be separate devices.

In one use case, a sequential list of comments may be linked to (attached) or otherwise associated with one or more features of a document, e.g., a field, table, header, footer, title, and so on. The sequential list of comments may comprise a comment thread in one embodiment. A set of actions it performed for each comment of the comments, for example in an order from a beginning of the sequential list to an end of the sequential list. The comment may be analyzed to identify a printing command and parameters of the printing command. A printer is operated with the printing command and the parameters of the printing command to modify the feature of the document. In some cases the sequential list of comments may be re-sequenced to resolve dependencies or conflicts between printing commands specified in the comments. In some cases, the comments may be resolved (marked as resolved or closed) in the document, on condition that execution of the printing command is successful.

By way of example, a system for performing printer control automation from document annotations may include a parser and a processor. The parser (which may be executable instructions applied to the processor) is configured to extract the comments and topological features of the electronic document associated with the comments. The processor is further configured to transform the comments into executable instructions for a print engine and to determine parameters of the executable instructions from the comments and topological features of the electronic document to which the comments are attached or otherwise associated. The processor applies the executable instructions and parameters to the print engine.

Comment data from an electronic document such as a PDF may be interpreted using a machine learning system. The machine learning system may be trained utilizing user input data from a printer database. The user input data may be natural language strings. Samples of the training data provided to the machine learning system may embody the following instructions to the print engine or a human operator of the printer:

Activate the use of comments as instructions for printing.
Alert the operator of instructions for printing the document.
Blank out a document feature/section with a horizontal line of a particular color.
Execute a punch hole of the document.
Add water mark to a location/feature/section linked to or associated with the comment.
Download a document (e.g., from a local area network server or a web server) and perform VDP (variable data printing) using identified column(s) and/or row(s) from structured fields in the document.
Send a copy of one or more document features/sections as text and/or image via email to a provided communication address.
Replace or fill a document feature/field with date and time.
Print associated feature/section using a particular color.
Delete document feature/section.
Replace document feature/section.

Henceforth, a reference to a document "feature" should be understood to include any sub-region of a document—field(s), section(s), page(s), table(s), header(s), footer(s), image(s), style(s), and so on. Comments should be understood to include text, images, emojis, and so on in any combination (any meta-layer of content linked/associated with document features, provided as a meta- or overlay layer to the document and distinct from the document content to print. The comments may be encoded as natural language, XJDF, Postscript, JSON, and other encodings known in the art.

Figure 1:
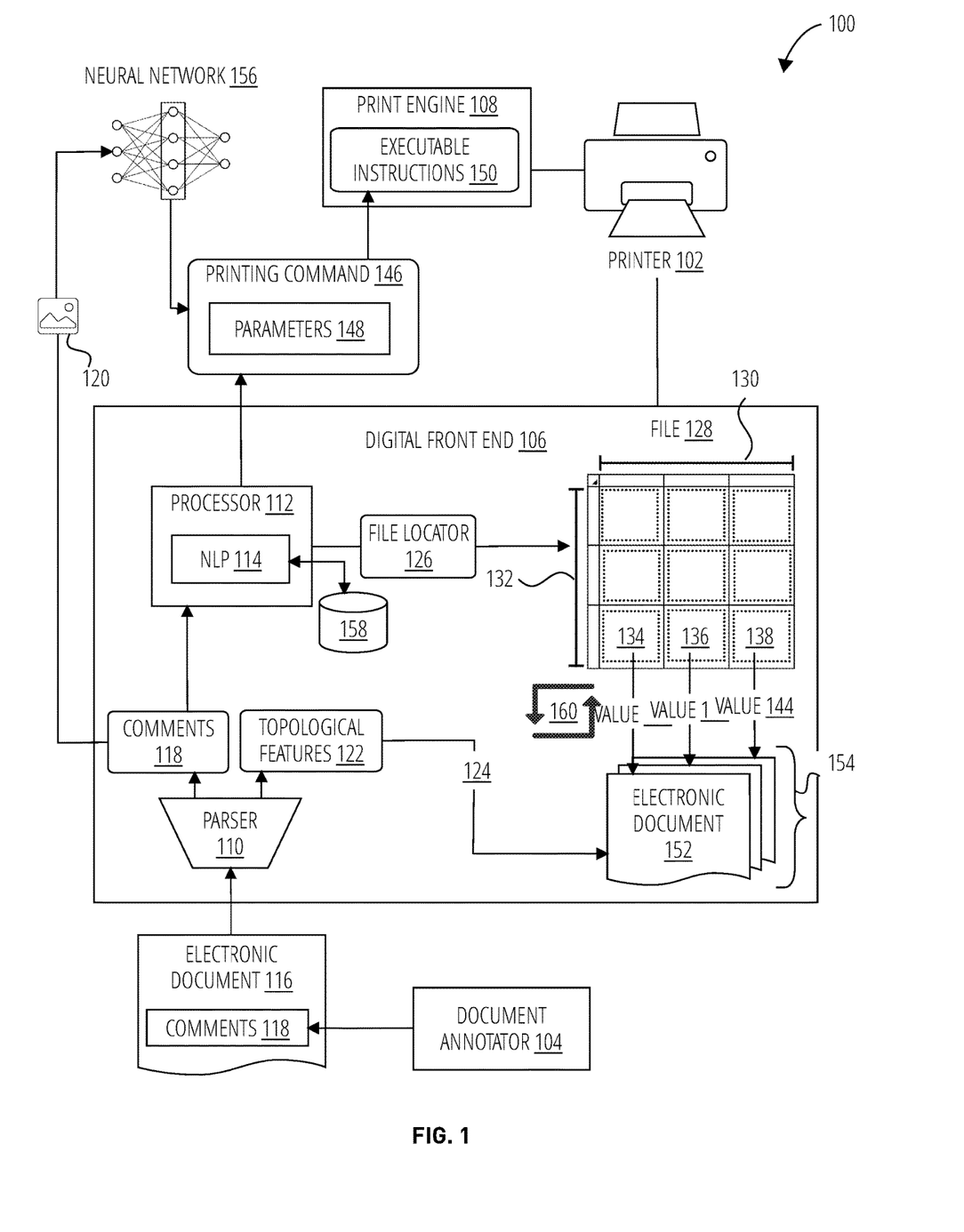
FIG. 1 depicts a printing system 100 in accordance with one embodiment.

FIG. 1 depicts a printing system 100 in accordance with one embodiment. The printing system 100 comprises a printer 102, a document annotator 104, and an electronic document 116. The printer 102 comprises a print engine 108 and a digital front end 106. The digital front end 106 comprises a parser 110 and a processor 112. The processor 112 may be configured to operate as a natural language processor 114.

In the printing system 100, the document annotator 104 adds comments 118 to the electronic document 116. The parser 110 extracts the comments 118 and topological features 122 of the electronic document 116 associated with the comments 118. The processor 112 is adapted to analyze the comments 118 for a file locator 126. The processor 112 analyzes the comments 118 for a horizontal range 130 and a vertical range 132 in a file 128 identified by the file locator 126. The processor 112 executes a loop 160 iterated across discrete locations (discrete location 134, discrete location 136, discrete location 138) of the horizontal range 130 and the vertical range 132. During each iteration, different versions 154 of the electronic document 152 are generated. During each iteration a value (value 140, value 142, and value 144) from a different one of the discrete locations (discrete location 134, discrete location 136, and discrete location 138), are inserted into a different versions 154 of the electronic document 152 at a location (document field 124) associated with the topological features 122 associated with the comments 118.

In some configurations, the file locator 126 is a uniform resource locator.

In some configurations, the topological features 122 may include a field to which the comments 118 is attached (linked or otherwise associated with the topological features 122 by the document annotator 104).

In some configurations, the file 128 may be a spreadsheet and the horizontal range 130 may be a column or columns while the vertical range 132 may be a row or rows. In this configuration, the discrete locations (discrete location 134, discrete location 136, and discrete location 138) are cells of the spreadsheet.

In some configurations, the comments 118 are annotations to the electronic document that are visually associated with the topological features 122.

The printing system 100 may be operated such that, the electronic document 116 is parsed to extract at least one comment (comments 118) and topological features 122 of the electronic document 116 associated with the at least one comment. The comments 118 are analyzed to identify a printing command 146. The comments 118 are analyzed to identify parameters of the printing command 148. The printer 102 is then operated with the printing command 146 and the parameters of the printing command 148 on content of the document associated with the topological features 122.

In this operation of the printing system 100, the parser 110 (e.g., the processor 112 configured with instructions to operate as a document parser) extracts the comments 118 and topological features 122 of the electronic document 116 associated with the comments 118. The processor 112 may be adapted to transform the comments 118 into executable instructions 150 for the print engine 108. The processor may determine parameters of the printing command 148 of the executable instructions 150 from the comments 118 and topological features 122 of the electronic document 116 to which the comments 118 are attached. The processor may apply the executable instructions 150 and parameters of the printing command 148 to the print engine 108.

In some configurations, at least one comment (comments 118) comprises an image 120. The image 120 is input to a neural network 156 (e.g., a convolutional neural network trained (configured) as an image perceptron) to generate a classification of the comment (comments 118).

In a common configuration, the comments 118 may include text. The processor may be configured as a natural language processor 114 that utilizes a semantic map 158. Techniques for utilizing semantic maps with natural language processors are known in the art. The text may be an input to a natural language processor 114 to extract parameters of the printing command 148.

The printing command 146 comprises one or more executable instructions 150 for a print engine 108 of the printer 102. The printing command 146 may in some cases instruct a digital front end to extract and email a portion of the electronic document 116 associated with the topological features 122. The topological features 122 may include a Tillable document field 124.

In some configurations, the printing system 100 may operate on a sequential list of comments in a document. The printing system 100 may analyze each comment in the sequential list of comments to identify one or more printing command 146. The printing system 100 may analyze each said comment to identify parameters of the printing command 148. The printing system 100 may operate the printer 102 (via the print engine 108) with the printing command 146 and parameters of the printing command 148 on the feature of the document to which the sequential list of comments is attached. This set of operations may be performed for each comment of the comments, in an order from a beginning of the sequential list to an end of the sequential list. The sequential list of comments may be re-sequenced to resolve dependencies or conflicts between printing command 146 specified in the comments 118. That is, the printing system 100 may analyze the sequential list of comments as a whole to identify dependencies between commands encoded in the sequential list of comments, and may re-order the commands encoded in the sequential list of comments to satisfy these dependencies. The comments 118 may be resolved (marked as complete, deleted, or marked "resolved") in the document on condition of successful execution of the printing command 146.

Figure 2A:
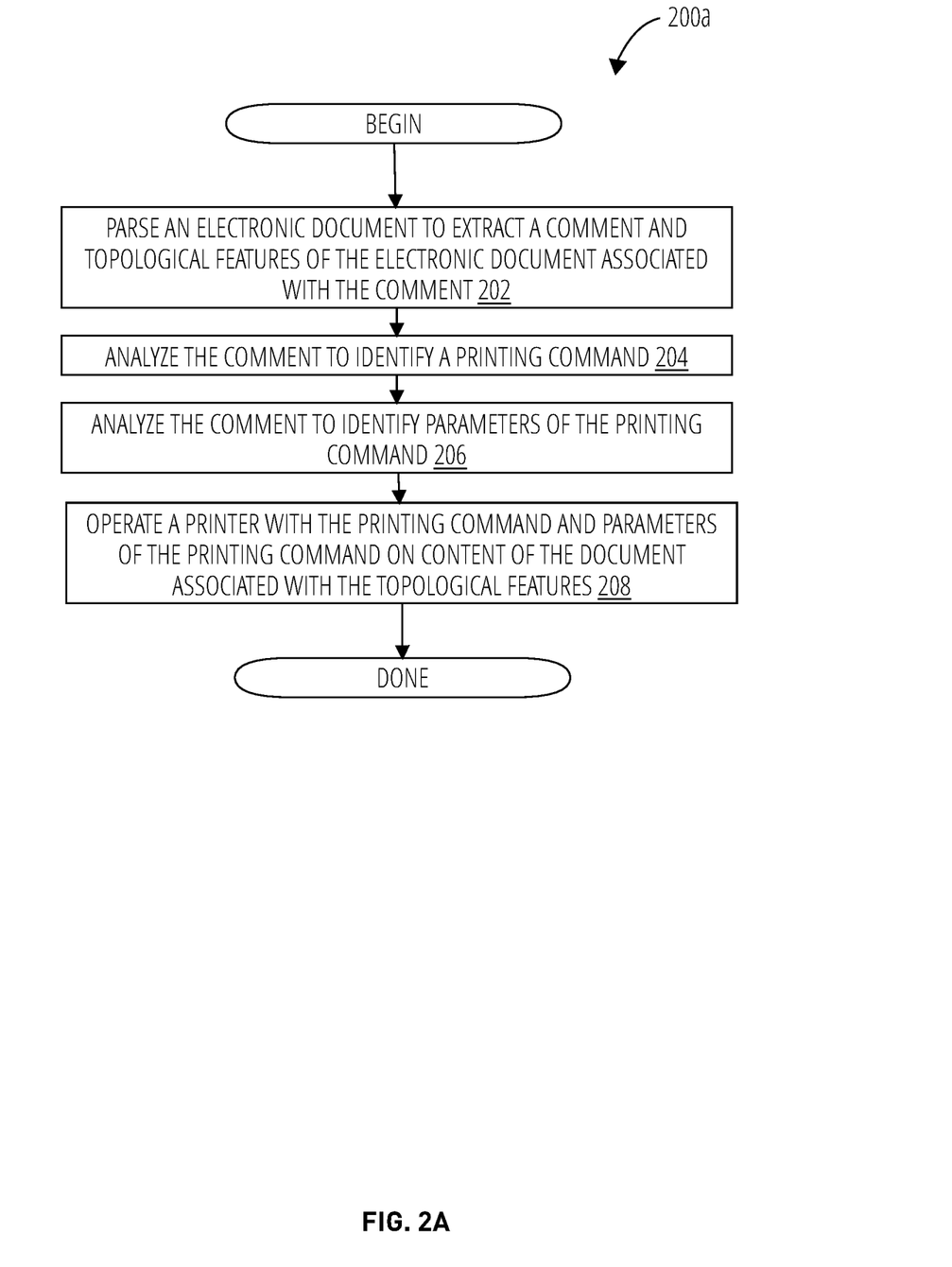
FIG. 2A depicts a printing process 200a in accordance with one embodiment.
Figure 2B:
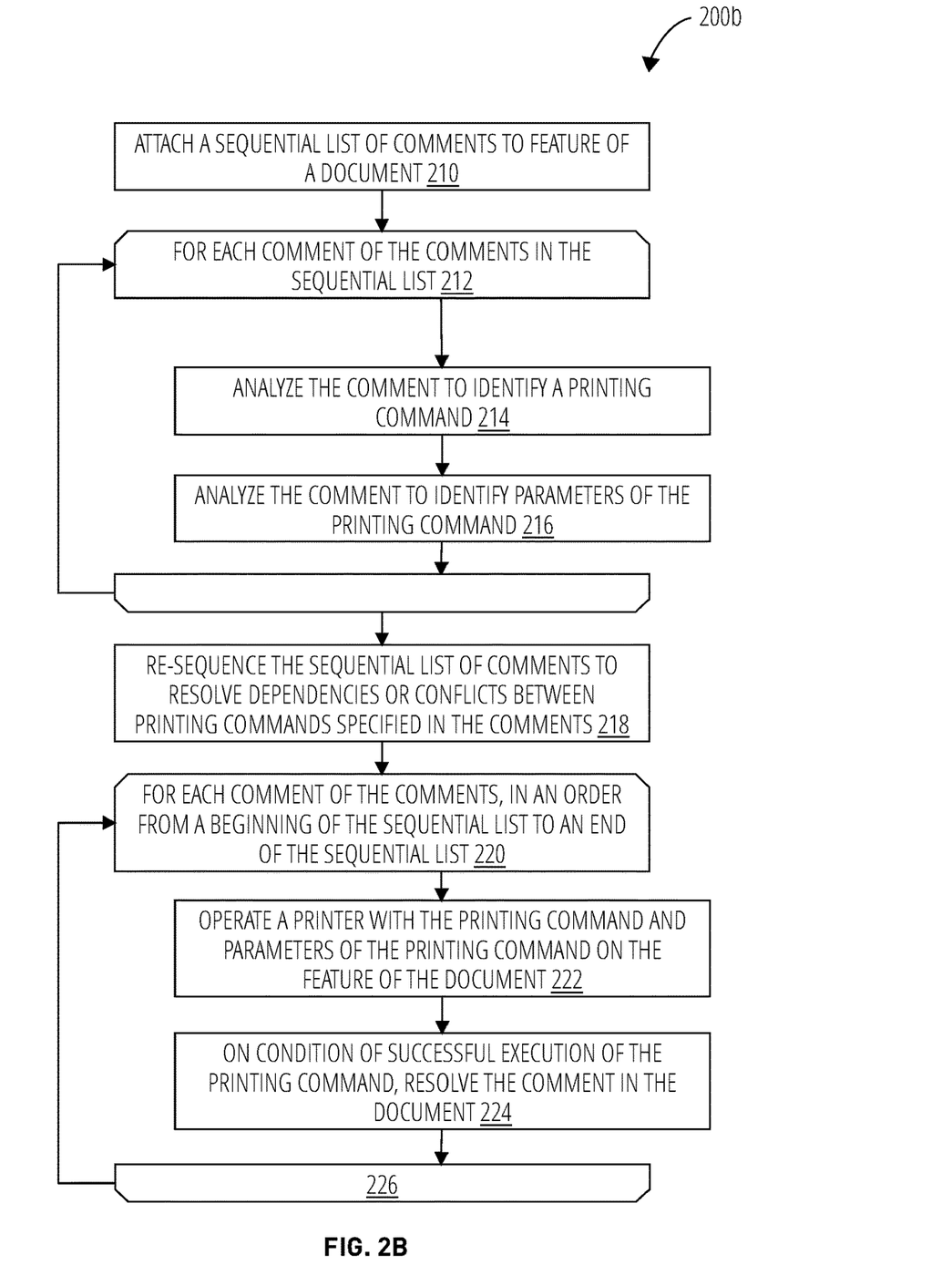
FIG. 2B depicts a printing process 200b in accordance with one embodiment.
Figure 2C:
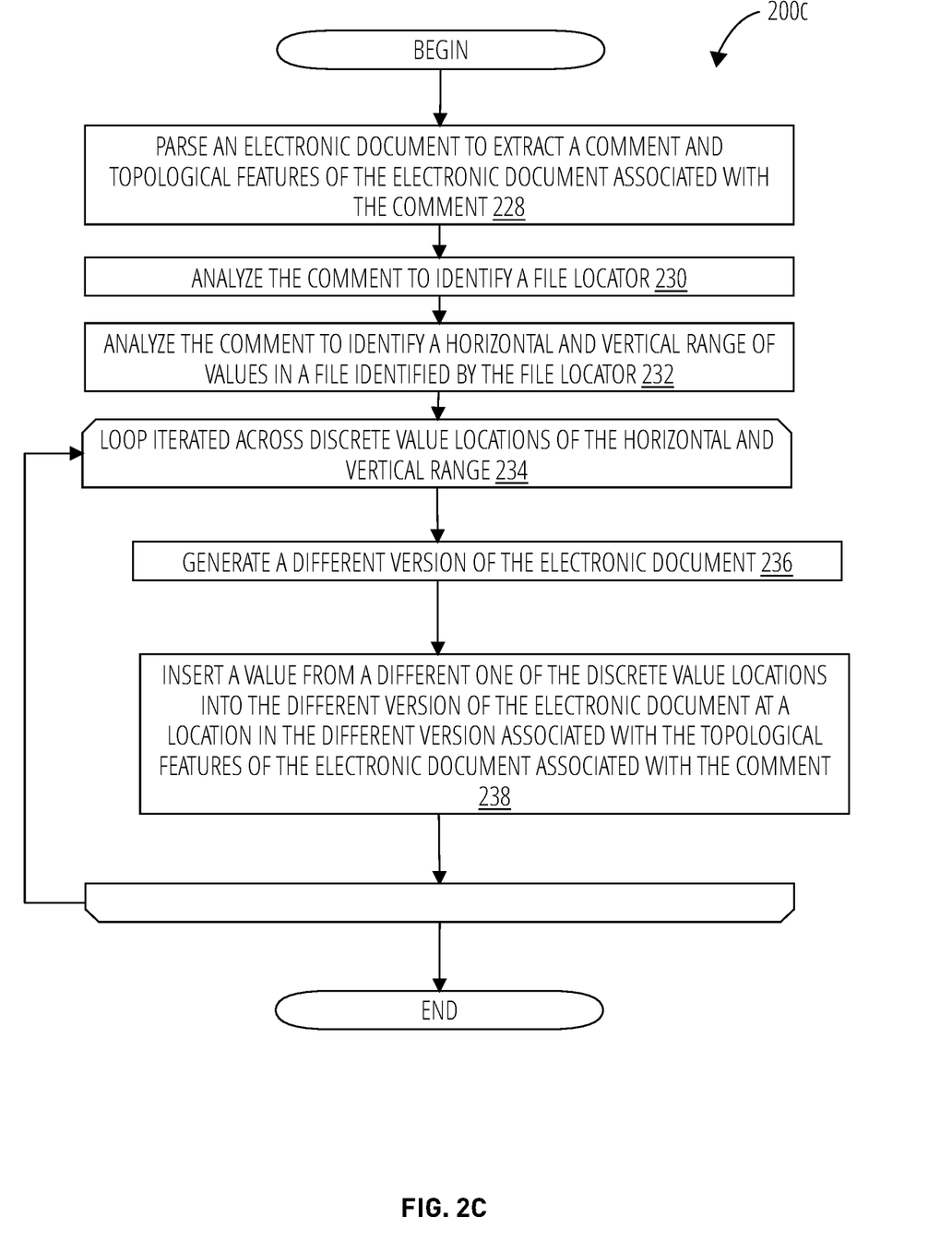
FIG. 2C depicts an electronic document generation process 200c in accordance with one embodiment.

The printing system 100 may be operated for example in accordance with the printing process 200*a*, printing process 200*b*, and electronic document generation process 200*c* described in FIG. 2A, FIG. 2B, and FIG. 2C, respectively.

FIG. 2A depicts a printing process 200*a* in accordance with one embodiment. In block 202, the printing process 200*a* parses an electronic document to extract a comment and topological features of the electronic document associated with the comment. In block 204, the printing process 200*a* analyzes the comment to identify a printing command. In block 206, the printing process 200*a* analyzes the comment to identify parameters of the printing command. In block 208, the printing process 200*a* operates a printer with the printing command and parameters of the printing command on content of the document associated with the topological features, i.e., specifically to the topological features to which the comment is attached.

FIG. 2B depicts a printing process 200*b* in accordance with another embodiment. In block 210, the printing process 200*b* attaches a sequential list of comments to feature of a document. In opening loop block 212, the printing process 200*b* performs the actions of block 214 and block 216 for each comment of the comments, in an order from a beginning of the sequential list to an end of the sequential list (potentially also re-ordering the commands encoded in the comments to satisfy dependencies).

In block 214, the printing process 200*b* analyzes the comment to identify a printing command. In block 216, the printing process 200*b* analyzes the comment to identify parameters of the printing command. In block 218, the printing process 200*b* (optionally) re-sequences the sequential list of comments to resolve dependencies or conflicts between printing commands specified in the comments.

In opening loop block 220, the printing process 200*b* performs actions of block 222 and block 224 for each comment of the comments, in an order from a beginning of the sequential list to an end of the sequential list. In block 222, the printing process 200*b* operates a printer with the printing command and parameters of the printing command on the feature of the document. In block 224, the printing process 200*b*, on condition of successful execution of the printing command, resolves the comment(s) in the document. In closing loop block 226, the printing process 200*b* completes performing the actions of block 222 and block 224 when the iteration reaches the final comment/command in the sequential list.

FIG. 2C depicts an electronic document generation process 200*c* in accordance with one embodiment. In block 228, the electronic document generation process 200*c* parses an electronic document to extract a comment and topological features of the electronic document associated with the comment. In block 230, the electronic document generation process 200c analyzes the comment to identify a file locator. In block 232, the electronic document generation process 200c analyzes the comment to identify a horizontal and vertical range of values in a file identified by the file locator. In opening loop block 234, the electronic document generation process 200c executes a loop iterated across discrete value locations of the horizontal and vertical range performing the actions of block 236 and block 238. In block 236, the electronic document generation process 200c may generate at each iteration a different version of the electronic document. In block 238, the electronic document generation process 200c inserts at each iteration a value from a different one of the discrete value locations into the different version of the electronic document at a location in the different version associated with the topological features of the electronic document associated with the comment.

Figure 3A:
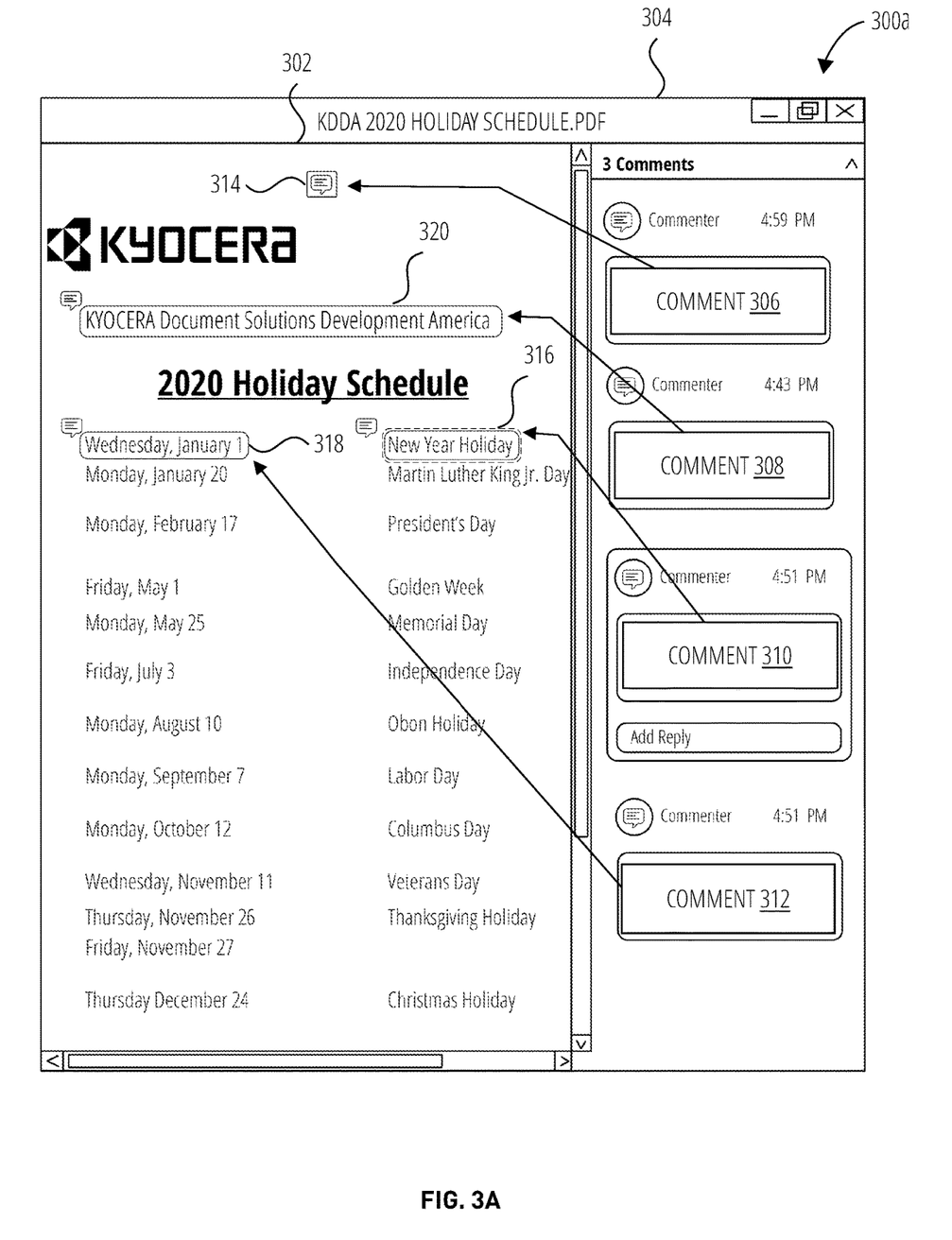
FIG. 3A depicts a comment-annotated document 300a in accordance with one embodiment.

FIG. 3A depicts a comment-annotated document 300a in accordance with the one embodiment. The comment-annotated document 300a as depicted is an electronic document 302 opened in a document annotator 304. The document annotator 304 identifies fields (document field 314, document field 316, and document field 318) to which comments (comment 308, comment 310, and comment 312) are attached. In the comment-annotated document 300a, the electronic document 302 is a PDF document with the file name "KDDA 2020 Holiday Schedule.pdf". The document annotator 304 has been operated to add four comments (comment 306, comment 308, comment 310, and comment 312).

The comment 306 in this example may be "Download the csv file from http://kyocera.com/employeeaddress.csv and use column 1, row 1 to row 100 for the replacement data" where the "http://kyocera.com/employeeaddress.csv" serves as the file locator for the file and the "use column 1, row 1 to row 100" are the range of discrete locations from the file to be used. The system recognizes that the phrasing "row 1 to row 100" identifies a printing command such that for each copy of the printed document, a discrete value from row 1 is to be inserted (the employee address, in this case) at the location to which comment 306 is attached, up to 100 distinct copies (e.g., one copy per employee).

The comment 308 on document field 320 in this example may be "Print in red", which transforms into a printer command indicating the title text "Kyocera Document Solutions Development America", the topological feature to which comment 308 is attached, is to be printed in red ink on all copies.

The comment 310 in this example may be "Download the csv file from http://kyocera.com/holiday2020.csv and use column 1 for the replacement data" where the "http://kyocera.com/holidayschedule.csv" serves as the file locator for the file and "use column 1 for the replacement data" transforms into a printer command to insert the entire contents of column 1 (the holiday dates) in the document at the location to which comment 310 is attached. The comment-annotated document 300a is depicted as it would appear in printed form, with the holiday dates inserted.

The comment 312 in this example reads "Download the csv file from http://kyocera.com/holiday2020.csv and use column 2 for the replacement data" where the "http://kyocera.com/holidayschedule.csv" serves as the file locator for the file and the "use column 2 for the replacement data" transforms into a printer command to insert the entire contents of column 2 (the holiday names) in the document at the location to which comment 312 is attached. The comment-annotated document 300a is depicted as it would appear in printed form, with the holiday names inserted.

When the electronic document 302 is sent to a printing system, the printer (or, for example, a digital front end of the printer) may identify the comments, apply parsing and natural language processing, and potentially also perceptron or other machine learning model processing (e.g., if the comments comprise images or emojis) to transform the comments into printing commands and parameters of the printing commands. The printer may parse one or more pages of the electronic document 302 to extract the comments (comment 306, comment 308, comment 310, and comment 312). The printer may access the employeeaddress.csv and holidayschedule.csv files, and determine that multiple copies of the document may be generated each customized with data from those files. An example of an employeeaddress.csv is the file with discrete locations for values 300b depicted in FIG. 3B, and an example of a holidayschedule.csv file with discrete locations for values 300c is depicted in FIG. 3C.

Figure 3B:
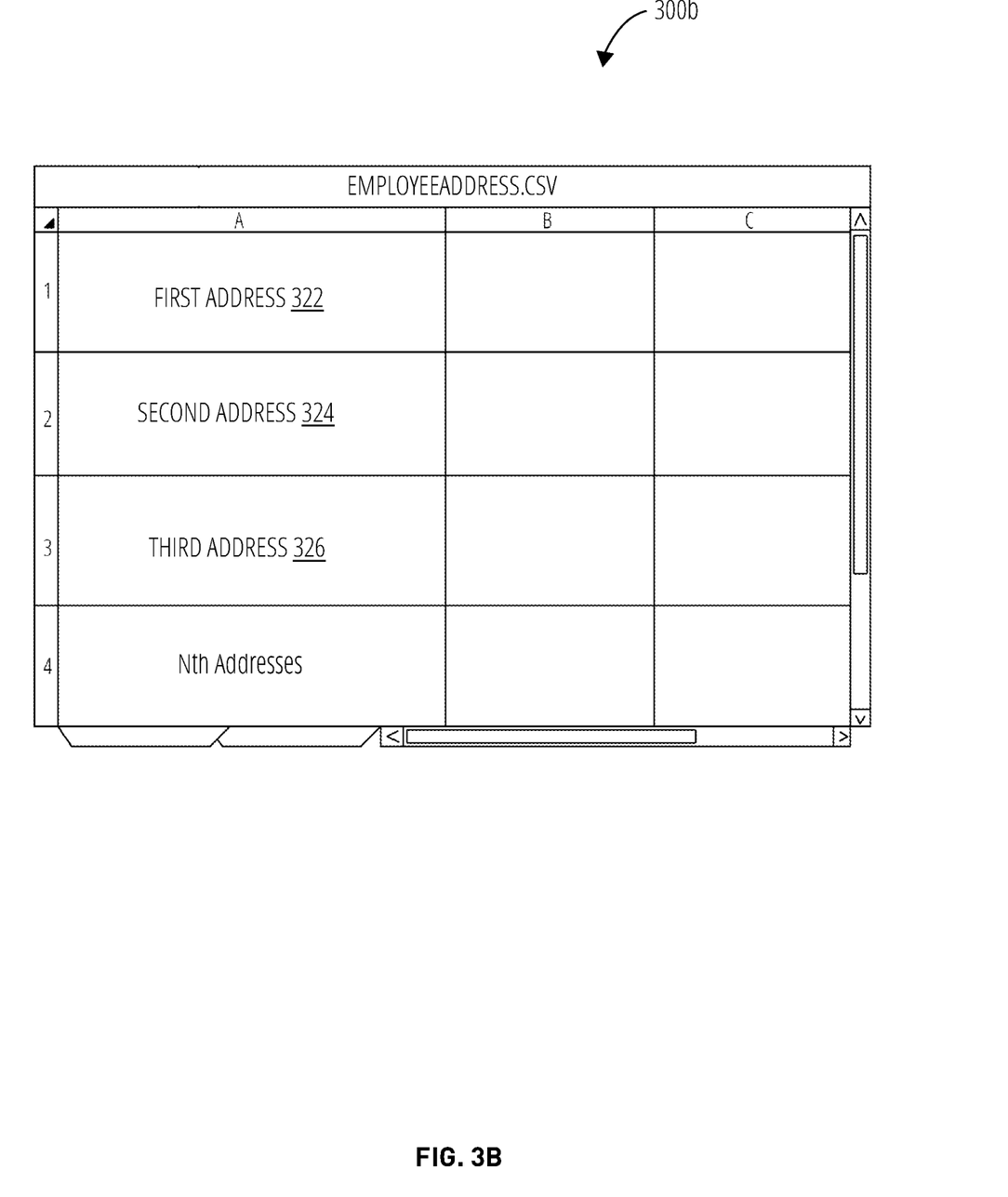
FIG. 3B depicts a file with discrete locations for values 300b in accordance with one embodiment.

FIG. 3B depicts a file with discrete locations for values 300b in accordance with one embodiment. The file with discrete locations for values 300b is a file titled "employeeaddress.csv" and comprises values in the first column comprising first address 322, second address 324, third address 326 and nth addresses that may be utilized by a printing system as replacement data inserted at a location or topological feature(s) of an attached comment comprising an identifier of the file.

Figure 3C:
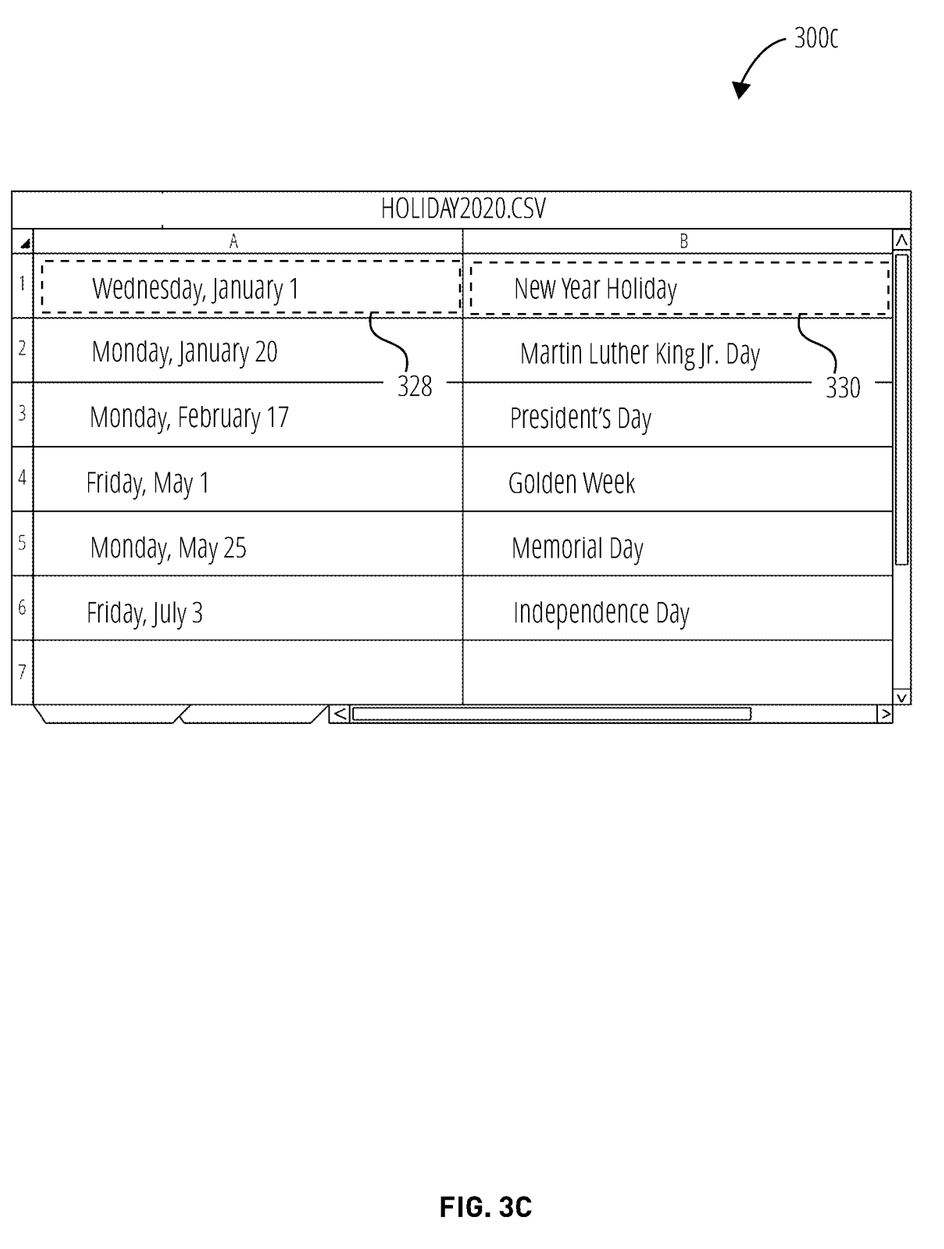
FIG. 3C depicts a file with discrete locations for values 300c in accordance with one embodiment.

FIG. 3C depicts a file with discrete locations for values 300c in accordance with one embodiment. The file with discrete locations for values 300c is a file titled "holiday2020.csv" and comprises discrete locations with values in the first and second column, e.g., value 328 and value 330. The first column comprises holiday dates and the second column comprises holiday names. These may be utilized by a printing system as replacement data inserted at a location or topological feature(s) of an attached comment comprising an identifier of the file.

Machine Embodiments

Figure 4:
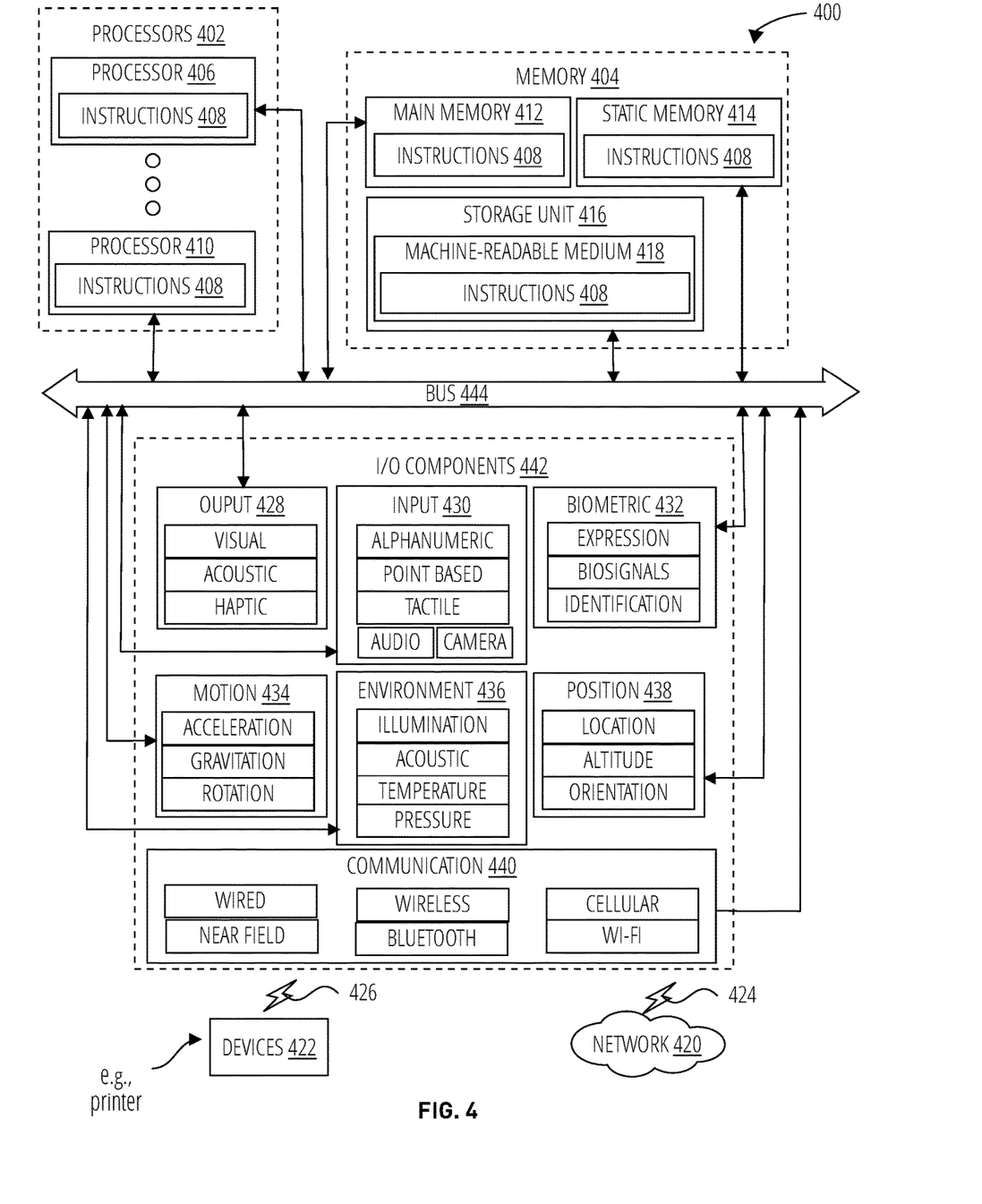
FIG. 4 depicts a diagrammatic representation of a digital front end 400 in the form of a computer system within which a set of instructions may be executed for performing any one or more of the methodologies discussed herein, according to an example embodiment.

FIG. 4 depicts a diagrammatic representation of a digital front end 400 in the form of a computer system within which logic may be implemented to perform aspects of the techniques disclosed herein, according to an example embodiment.

Specifically, FIG. 4 depicts a digital front end 400 comprising instructions 408 (e.g., a program, an application, an applet, an app, or other executable code) for causing the digital front end 400 to perform any one or more of the functions or methods discussed herein. For example the instructions 408 may cause the digital front end 400 to carry out aspects of the printing process 200a, printing process 200b, and electronic document generation process 200c. The instructions 408 configure a general, non-programmed machine into a particular digital front end 400 programmed to carry out said functions and/or methods. It will be appreciated that a printer itself may be configured similarly to carry out the processes.

In alternative embodiments, the digital front end 400 operates as a standalone device or may be coupled (e.g., networked) to other machines. In a networked deployment, the digital front end 400 may operate in the capacity of a server machine or a client machine in a server-client network environment, or as a peer machine in a peer-to-peer (or distributed) network environment. The digital front end 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 408, sequentially or otherwise, that specify actions to be taken by the digital front end 400. Further, while only a single digital front end 400 is depicted, the term "machine" shall also be taken to include a collection of machines that individually or jointly execute the instructions 408 to perform any one or more of the methodologies or subsets thereof discussed herein.

The digital front end 400 may include processors 402, memory 404, and I/O components 442, which may be configured to communicate with each other such as via one or more bus 444. In an example embodiment, the processors 402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 406 and processor 410) to execute the instructions 408. The term "processor" is intended to include multi-core processors that may comprise two or more independent processors (sometimes referred to as "cores") that may execute instructions contemporaneously. Although FIG. 4 depicts multiple processors 402, the digital front end 400 may include a single processor with a single core, a single processor with multiple cores (e.g., a multi-core processor), multiple processors with a single core, multiple processors with multiples cores, or any combination thereof.

The memory 404 may include one or more of a main memory 412, a static memory 414, and a storage unit 416, each accessible to the processors 402 such as via the bus 444. The main memory 412, the static memory 414, and storage unit 416 may be utilized, individually or in combination, to store the instructions 408 embodying any one or more of the functionalities described herein. The instructions 408 may reside, completely or partially, within the main memory 412, within the static memory 414, within a machine-readable medium 418 within the storage unit 416, within at least one of the processors 402 (e.g., within the processor's cache memory), or any suitable combination thereof, during execution thereof by the digital front end 400.

The I/O components 442 may include a wide variety of components to receive input, provide output, produce output, transmit information, exchange information, capture measurements, and so on. The specific I/O components 442 that are included in a particular machine will depend on the type of machine. For example, portable machines such as mobile phones will likely include a touch input device or other such input mechanisms, while a headless server machine will likely not include such a touch input device. It will be appreciated that the I/O components 442 may include many other components that are not shown in FIG. 4. The I/O components 442 are grouped according to functionality merely for simplifying the following discussion and the grouping is in no way limiting. In various example embodiments, the I/O components 442 may include output components 428 and input components 430. The output components 428 may include visual components (e.g., a display such as a plasma display panel (PDP), a light emitting diode (LED) display, a liquid crystal display (LCD), one or more printers, a projector, or a cathode ray tube (CRT)), acoustic components (e.g., speakers), haptic components (e.g., a vibratory motor, resistance mechanisms), other signal generators, and so forth. The input components 430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, scanners for rasterizing printing documents, and the like.

In further example embodiments, the I/O components 442 may include biometric components 432, motion components 434, environmental components 436, or position components 438, among a wide array of possibilities. For example, the biometric components 432 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environmental components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 438 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 442 may include communication components 440 operable to couple the digital front end 400 to a network 420 or devices 422 via a coupling 424 and a coupling 426, respectively. For example, the communication components 440 may include a network interface component or another suitable device to interface with the network 420. In further examples, the communication components 440 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 422 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 404, main memory 412, static memory 414, and/or memory of the processors 402) and/or storage unit 416 may store one or more sets of instructions and data structures (e.g., software) embodying or utilized by any one or more of the methodologies or functions described herein. These instructions (e.g., the instructions 408), when executed by processors 402, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 420 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 420 or a portion of the network 420 may include a wireless or cellular network, and the coupling 424 may be a Code Division Multiple Access (CDMA) connection, a Global System for Mobile communications (GSM) connection, or another type of cellular or wireless coupling. In this example, the coupling 424 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 408 and/or data generated by or received and processed by the instructions 408 may be transmitted or received over the network 420 using a transmission medium via a network interface device (e.g., a network interface component included in the communication components 440) and utilizing any one of a number of well-known transfer protocols (e.g., hypertext transfer protocol (HTTP)). Similarly, the instructions 408 may be transmitted or received using a transmission medium via the coupling 426 (e.g., a peer-to-peer coupling) to the devices 422. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 408 for execution by the digital front end 400, and/or data generated by execution of the instructions 408, and/or data to be operated on during execution of the instructions 408, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
   parsing an electronic document to extract a comment and topological features of the electronic document to which the comment is attached, wherein the comment comprises a loop command for generating multiple different printed versions of the electronic document;
   transforming the comment into one or more printing command and one or more parameters of the printing command;
   generating multiple different printed versions from the electronic document; and
   applying the printing command and parameters of the printing command specifically to the topological features to which the comment is attached when generating the multiple different printed versions.

2. The method of claim 1, wherein the printing command comprises a uniform resource locator.

3. The method of claim 1, wherein the topological features comprise a field of the electronic document to which the comment is attached.

4. The method of claim 1, wherein the topological features comprise a range of text to which the comment is attached.

5. The method of claim 1, wherein the comment comprises an identification of a column in a spreadsheet.

6. The method of claim 1, wherein the comment is an annotation to the electronic document that is visually associated with the topological features.

7. A system comprising:
   a print engine;
   a processor;
   logic to configure the processor to:
     extract comments from an electronic document;
     extract topological features of the electronic document associated with the comments;
     transform the comments into executable instructions for the print engine;
     determine parameters of the executable instructions from the comments and topological features of the electronic document to which the comments are attached; and
     apply the executable instructions and parameters of the executable instructions to the print engine specifically for printing the topological features;
   a perceptron neural network configured to receive an image from the comments; and
   the neural network configured to transform the image into the executable instructions.

8. The system of claim 7 further comprising logic to configure the processor to be a natural language processor to transform the comments into the executable instructions.

9. The system of claim 7, wherein the logic further configures the processor to transform one or more of the comments into the executable instructions to extract and email a portion of the electronic document comprising the topological features.

10. The system of claim 7, wherein the topological features comprise one or more fillable document field.

11. The system of claim 7, wherein the logic is installed on a digital front end.

12. A system comprising:
    a print engine;
    a processor;
    logic to configure the processor to:

extract comments from an electronic document;
extract topological features of the electronic document associated with the comments;
transform the comments into executable instructions for the print engine;
determine parameters of the executable instructions from the comments and topological features of the electronic document to which the comments are attached;
apply the executable instructions and parameters of the executable instructions to the print engine specifically for printing the topological features; and
transform one or more of the comments into the executable instructions to extract and email a portion of the electronic document comprising the topological features.

13. The system of claim 12 further comprising logic to configure the processor to be a natural language processor to transform the comments into the executable instructions.

14. The system of claim 12, further comprising:
a perceptron neural network configured to receive an image from the comments; and
the neural network configured to transform the image into the executable instructions.

15. The system of claim 12, wherein the topological features comprise one or more fillable document field.

16. The system of claim 12, wherein the logic is installed on a digital front end.

* * * * *